(12) United States Patent
Brouty et al.

(10) Patent No.: US 9,194,431 B2
(45) Date of Patent: Nov. 24, 2015

(54) SUSPENSION THRUST BEARING DEVICE AND SUSPENSION STRUT EQUIPPED WITH SUCH A THRUST BEARING

(71) Applicants: Cedric Brouty, Rouziers de Touraine (FR); Sylvain Bussit, Monnaie (FR); Christophe Houdayer, Semblancay (FR); Hemanth G N Kumar, Karnataka (IN); Pascal Quenardelle, Semblancay (FR); Jean-Marc Soudee, Chambray-les-Tours (FR)

(72) Inventors: Cedric Brouty, Rouziers de Touraine (FR); Sylvain Bussit, Monnaie (FR); Christophe Houdayer, Semblancay (FR); Hemanth G N Kumar, Karnataka (IN); Pascal Quenardelle, Semblancay (FR); Jean-Marc Soudee, Chambray-les-Tours (FR)

(73) Assignee: AKTIEBOGAGET SKF, Gothenburg (SE)

( * ) Notice: Subject to any disclaimer, the term of this patent is extended or adjusted under 35 U.S.C. 154(b) by 0 days.

(21) Appl. No.: 14/243,234

(22) Filed: Apr. 2, 2014

(65) Prior Publication Data

US 2014/0301691 A1 Oct. 9, 2014

(30) Foreign Application Priority Data

Apr. 2, 2013 (FR) .................................... 13 52956

(51) Int. Cl.
| | | |
|---|---|---|
| *F16C 33/58* | (2006.01) | |
| *F16C 27/06* | (2006.01) | |
| *F16C 19/10* | (2006.01) | |
| *B60G 15/06* | (2006.01) | |
| *F16C 27/08* | (2006.01) | |

(52) U.S. Cl.
CPC ............ *F16C 33/583* (2013.01); *B60G 15/068* (2013.01); *F16C 27/08* (2013.01); *B60G 2204/128* (2013.01); *B60G 2204/418* (2013.01); *B60G 2204/45021* (2013.01); *F16C 19/10* (2013.01); *F16C 2326/05* (2013.01)

(58) Field of Classification Search
CPC .... F16C 2326/05; F16C 19/10; F16C 33/583; F16C 27/08; B60G 15/068; B60G 2204/418; B60G 2204/128; B60G 2204/45021
See application file for complete search history.

(56) References Cited

U.S. PATENT DOCUMENTS

| | | | |
|---|---|---|---|
| 7,364,177 B2 * | 4/2008 | Handke et al. ......... | 280/124.147 |
| 8,496,235 B2 * | 7/2013 | Viault et al. .................. | 267/220 |
| 8,496,383 B2 * | 7/2013 | Viault et al. .................. | 384/617 |
| 8,740,472 B2 * | 6/2014 | Corbett et al. ................ | 384/609 |
| 8,851,762 B2 * | 10/2014 | Corbett et al. ................ | 384/609 |
| 8,894,295 B2 * | 11/2014 | Stautner et al. ............... | 384/615 |
| 8,939,439 B2 * | 1/2015 | Corbett et al. ................ | 267/220 |
| 2011/0133379 A1 * | 6/2011 | Viault et al. .................. | 267/217 |

(Continued)

FOREIGN PATENT DOCUMENTS

| | | |
|---|---|---|
| EP | 1591691 A1 | 11/2005 |
| EP | 1609632 A2 | 12/2005 |

(Continued)

*Primary Examiner* — Alan B Waits
(74) *Attorney, Agent, or Firm* — Bryan Peckjian; SKF USA Inc. Patent Dept.

(57) ABSTRACT

A suspension thrust bearing (1) including at least one rolling bearing (7) forming an axial thrust bearing disposed on a lower cap (6) is provided. The lower cap (6) includes a body (8) with an annular rolling bearing portion (8a) for a spring (2) and a tubular portion (8d) including a bore (8e) in which a shock absorber bump stop (4) is inserted. An axial contact surface (8h) is defined on the lower portion of the bore (8e) of the tubular portion (8d) against which the shock absorber bump stop (4) when deformed exerts a radial force (F2). The tubular portion (8d) includes a reinforcing insert (10) located at the level of this axial contact surface (8h).

10 Claims, 1 Drawing Sheet

(56) References Cited

U.S. PATENT DOCUMENTS

2012/0257849 A1* 10/2012 Corbett et al. ............... 384/607
2012/0292841 A1* 11/2012 Corbett et al. ............... 267/217
2014/0023307 A1* 1/2014 Stautner et al. ............... 384/615

FOREIGN PATENT DOCUMENTS

| FR | 2899154 A1 | 10/2007 |
|---|---|---|
| WO | 2011/070117 A1 | 6/2011 |

* cited by examiner

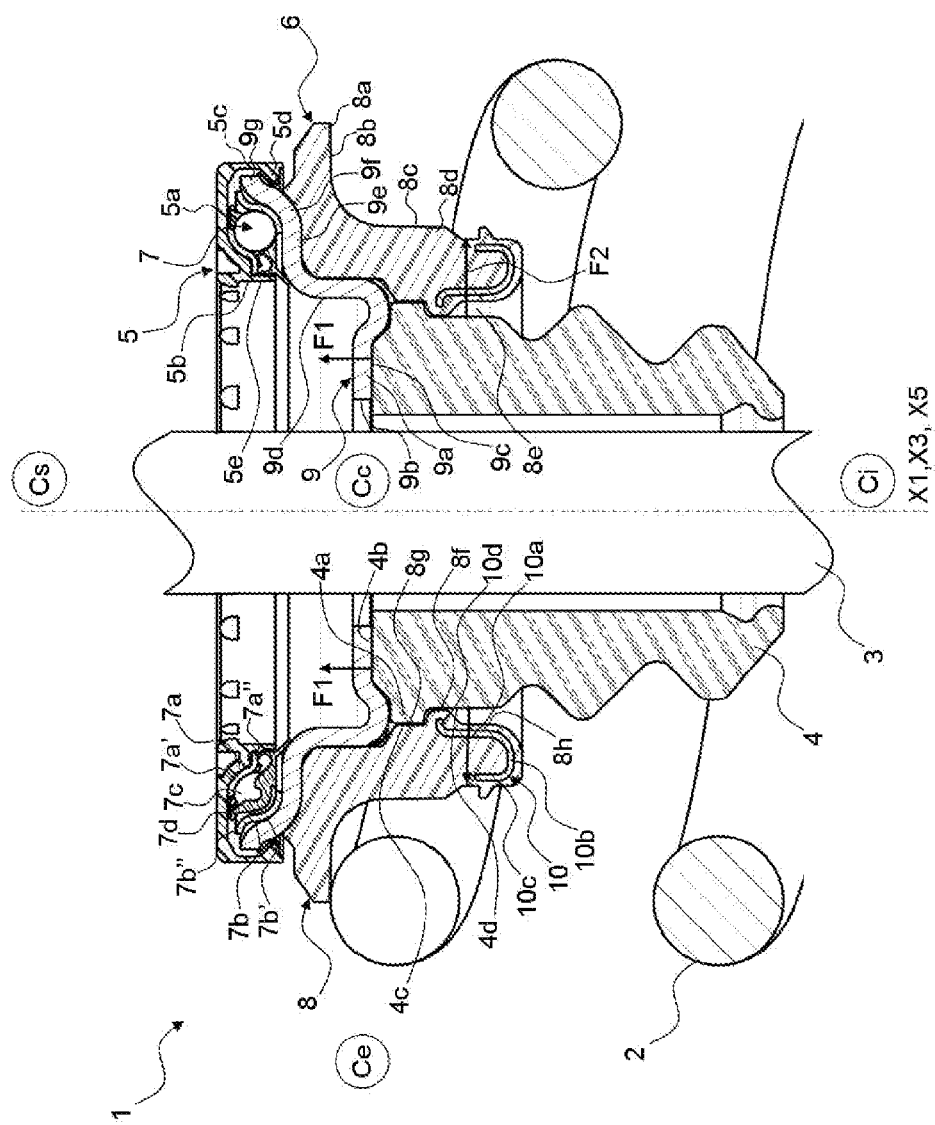

… (US 9,194,431 B2)

SUSPENSION THRUST BEARING DEVICE AND SUSPENSION STRUT EQUIPPED WITH SUCH A THRUST BEARING

CROSS-REFERENCE TO RELATED APPLICATIONS

This application claims priority to French Application 1352956 filed on Apr. 2, 2013, the contents of which are hereby fully incorporated by reference.

FIELD OF THE INVENTION

The present invention concerns the field of suspension thrust bearings, in particular of the MacPherson type. The invention also concerns a motor vehicle suspension strut comprising a shock absorber and such a suspension thrust bearing.

BACKGROUND OF THE INVENTION

As a general rule, a motor vehicle suspension system comprises a suspension strut supporting an axle and a vehicle wheel. A suspension thrust bearing is disposed in the upper portion of the suspension strut, opposite the wheel and the ground, between a suspension spring and an upper support block attached to the body of the vehicle. The suspension thrust bearing includes at least one rolling bearing. The spring is disposed around a shock absorber piston rod, the end of which may be attached to the body of the vehicle.

The suspension thrust bearing therefore enables transmission of axial forces between the spring and the body of the vehicle at the same time as allowing relative angular movement between the rolling bearing cup of the spring, which is mobile in rotation, and the fixed support block attached to the body. This relative angular movement may arise from turning a steerable wheel and/or compression of the suspension spring.

A shock absorber bump stop, for example of rubber or elastomer, is generally mounted around the piston rod of the shock absorber and inserted in a bore in the lower cap and immobilized axially under the suspension thrust bearing.

In the event of a shock to the suspension strut, the spring, the piston rod and the shock absorber bump stop are compressed axially and exert on the suspension thrust bearing a force that can exceed 60 kN. In particular, the shock absorber bump stop transmits an axial force against the suspension thrust bearing and is deformed radially. This radial deformation of the bump stop then exerts radial forces on the lower cap in which it is inserted, which can weaken the area of contact of the bump stop with the lower cap to the point of it breaking.

It is this problem that the invention more particularly intends to address by proposing a new suspension thrust bearing that is simple and economical to manufacture and to assemble at the same time as guaranteeing high resistance of the shock absorber bump stop to transmitted shocks.

To this end, the invention concerns a suspension thrust bearing including at least one rolling bearing forming an axial thrust bearing disposed on a lower cap. The lower cap includes a body with an annular rolling bearing portion for a spring and the tubular portion includes a bore in which a shock absorber bump stop is inserted.

In accordance with the invention, an axial contact surface defined on the lower portion of the bore of the tubular portion against which the shock absorber bump stop when deformed exerts a radial force and the tubular portion includes a reinforcing insert located at the level of this axial contact surface.

Thanks to the invention there is provided a suspension thrust bearing provided with a lower cap that is economical, robust and perfectly able to support forces encountered in normal use and forces caused by shocks transmitted by the shock absorber bump stop to the tubular portion.

The invention makes it possible to avoid having recourse to costly techniques or materials, such as an entirely metal lower cap that does not lend itself well to centering rolling bearing races pressed from thin sheet metal, often of complex shape, and the rolling bearing engagement of which on the cap must be carefully designed and regular in order to avoid deformation and deterioration of the lower race. A metal lower cap also represents an additional cost because of the necessity of applying an anticorrosion treatment to it, for example by cataphoresis.

Moreover, the suspension thrust bearing in accordance with the invention is suited to applications on different types of vehicles generating higher or lower axial and radial forces on the suspension, thereby making it possible to reduce greatly the cost of production of such a thrust bearing in that most of the component parts thereof may be made in one piece in one production operation and only the presence of an insert is specific for applications to very high forces applied in the event of shock.

SUMMARY OF THE INVENTION

In accordance with advantageous but not obligatory aspects of the invention, such a rolling bearing device may incorporate one or more of the following features in any technically permissible combination:

- The suspension thrust bearing includes at least one rolling bearing comprising an upper race, a lower race and a rolling bearing chamber between the two races in which rolling members are inserted.
- The rolling members are balls.
- The rolling members are held apart circumferentially by a cage.
- At least one of the two races of at least one of the rolling bearings of the suspension thrust bearing consists of pressed sheet metal having a substantially constant thickness.
- The suspension thrust bearing includes an upper cap in direct contact with the rolling bearing, the upper cap being mounted on and fastened to a support block connected to the chassis of a vehicle.
- The upper cap includes a synthetic material body.
- The upper cap has a shape matching that of the upper race of the rolling bearing.
- The lower cap is made from a plastic synthetic material.
- The annular portion of the lower cap supports the bearing directly on the upper side.
- The annular portion of the lower cap includes a metal annular support part supporting the rolling bearing.
- The annular portion of the lower cap has a shape matching that of the lower race of the rolling bearing.
- The suspension thrust bearing includes axial retaining means between the upper cap and the lower cap so as to constitute with the rolling bearing a unitary assembly.
- The axial retaining means between the upper and lower caps consist in an axial skirt of the upper cap including at its extremity a hook interfering with an annular rib of the lower cap.
- The tubular portion of the lower cap includes in its bore an annular bead directed toward the interior side of the suspension thrust bearing, the bead cooperating and interfering with an upper annular rib of the shock absorber bump stop enabling axial retention of the bump stop in the lower cap of the thrust bearing.

The insert is made from a material having a hardness greater than that of the material constituting the body of the lower cap, for example from metal.

The reinforcing insert is buried in the lower portion of the lower cap, for example by molding the cap around the insert.

The reinforcing insert of the tubular portion of the lower cap includes at least one axial portion.

The reinforcing insert of the tubular portion of the lower cap includes a first axial portion on the interior side of the thrust bearing, a second axial portion on the exterior side of the thrust bearing, the two axial portions being interconnected by a radial portion. Such a shape enables spring properties to be imparted to the insert, thereby reinforcing the cap in the event of shocks from the shock absorber bump stop at the same time as damping the deformation and facilitating the return to the initial shape after the force.

The radial portion connecting the two axial portions of the reinforcing insert is located on the lower side of the thrust bearing, globally imparting a U-shape to the insert.

The annular bead includes a reinforcing insert enabling its reinforcement in the event of a force exerted by the shock absorber bump stop.

The first axial portion of the insert located on the interior side of the suspension includes including a radial portion directed essentially toward the interior side of the thrust bearing. The radial portion is located in the annular bead.

The invention also concerns a suspension strut equipped with a suspension thrust bearing as described above.

BRIEF DESCRIPTION OF THE DRAWING

The invention will be better understood and other advantages thereof will become more clearly apparent in the light of the following description of one specific embodiment of a suspension thrust bearing in accordance with the invention, given by way of example only and with reference to the appended drawing, in which FIG. 1 is a view of the thrust bearing in axial section.

DETAILED DESCRIPTION OF THE INVENTION

A suspension thrust bearing 1 with central axis X1 is mounted between a coil spring 2 and a support block (not shown) connected to the chassis of a vehicle.

Hereinafter, to facilitate location of the thrust bearing 1 in space, there are defined a lower side Ci on which the ground and the wheel of the vehicle are located and an upper side Cs opposite the lower side Ci. There are also defined an interior side Cc corresponding to the main axis X1 and an exterior side Ce opposite the axis X1 through the thrust bearing 1.

Moreover, for this and subsequent embodiments, the adjectives "axial" and "radial" and the adverb "axially" are defined relative to the central axis X1 of the thrust bearing 1. Thus an axial portion or part is parallel to the axis X1 while a radial part or portion is perpendicular to that axis and surrounds it. A surface is referred to as axial if it extends perpendicularly to the axis X1 and radial if it extends perpendicularly to a normal to that axis. For example, a radial portion has an interior surface oriented toward the interior side Cc of the thrust bearing 1, and therefore toward the axis X1, and a radial exterior surface oriented away from that axis, toward the exterior side Ce of the thrust bearing 1.

The suspension thrust bearing 1 is disposed around an elongate shock absorber rod 3 of circular cylinder shape along an axis X3. The axis X3 coincides with the axis X1 when the suspension thrust bearing 1 is not loaded, as shown in FIG. 1. The shock absorber rod 3 slides along the axis X3 in a piston body, not shown.

A shock absorber bump stop 4, for example of rubber or elastomer, is mounted around the rod 3 under the suspension thrust bearing 1.

The shock absorber bump stop 4 has an annular shape with a rib 4a that is also annular extending toward the exterior side Ce from the upper side Cs of the bump stop 4 in contact with the suspension thrust bearing 1.

The suspension thrust bearing 1 includes an upper cap 5, a lower cap 6 and a single rolling bearing 8. These three components are of globally circular shape about a central axis X5 coinciding with the axes X1 and X3 when the suspension thrust bearing 1 is not loaded.

The upper cap 5 consists in a one-piece part made from plastic synthetic material, for example from polyamide, optionally reinforced with glass fibers. The upper cap 5 has an upper radial portion 5a, an interior annular skirt 5b of relatively small diameter extending toward the lower side Ci of the suspension thrust bearing 1, and an exterior annular skirt 5c of relatively large diameter extending toward the lower side Ci of the suspension thrust bearing 1. The annular skirt 5b defines a bore 5f in which the rod 3 is mounted. The annular skirt 5c includes a hook 5d that may be continuous or discontinuous in the circumferential direction, taking the form of an axial projection directed toward the interior side Cc of the suspension thrust bearing 1. The upper cap 5 is maintained in contact with axial and/or radial surfaces of the upper cup.

The rolling bearing 7 includes a pressed sheet metal upper race 7a, a lower race 7b also of pressed sheet metal, a row of rolling members 7c, here balls, and a cage 7d for maintaining a regular circumferential spacing between the rolling members 7c. The rolling members are disposed between raceways formed by the upper race 7a and the lower race 7b. The upper race 7a includes a toroidal portion 7a' in contact with and having a shape matching that of a toroidal surface 5e defined on the surface of the lower side Ci of the upper radial portion 5a of the upper cap 5. The upper race 7a also includes a radial portion 7a", in line with the toroidal portion 7a', extending toward the interior side Cc, and in contact with and having a shape matching that of the surface of the lower side Ci of the upper radial portion 5a of the upper cap 5. The lower ring 7b also includes a toroidal portion 7b' the upper portion of which forms the raceway for the rolling members 7c and a radial portion 7b" extending toward the exterior side Ce. The rolling bearing 7 is entirely disposed between the annular skirts 5b and 5c of the upper cap 5. The rolling bearing 7 is the only one in the suspension thrust bearing 1 and it is in oblique contact in order to limit forces and friction inside the thrust bearing 1. In the FIG. 1 example, the oblique contact is directed toward the interior side Cc of the thrust bearing along an axis inclined at 45° relative to the axis X5.

The lower cap 6 includes a body 8 made from plastic synthetic material, for example from the same material as the upper cap 5, and a metal support 9 in the form of a relatively thick steel cup to guarantee positioning and retention with sufficient stiffness of the components of the suspension thrust bearing 1.

The metal support 9 includes a radial annular base 9a including a bore 9b in which the rod 3 is mounted. The bore 9b has an aperture diameter slightly greater than the diameter of the cylindrical exterior surface of the rod 3 so as to guide the rod 3 axially and radially within the suspension thrust bearing 1. The upper surface 4*b* of the rib 4*a* of the shock absorber bump stop 4 is in radial contact with the lower surface 9*c* of the annular base 9*a*. The radial annular base 9*a* is extended toward the upper portion Cs of the suspension thrust bearing 1 by an axial portion 9*d*, the two portions 9*a* and 9*d* here being connected by a portion of toroidal shape. The axial portion 9*d* is extended toward the exterior side Ce of the suspension thrust bearing 1 by a radial portion 9*e* providing a support for the lower race 7*b* of the rolling bearing 7. This radial portion 9*e* includes a toroidal portion 9*f* extended by a radial portion 9*g* toward the exterior side Ce so as to be in contact with and have a shape matching that of the toroidal portion 7*b*' and the radial portion 7*b*" of the lower race 7*b*. Moreover, the radial portion 9*g* forming the exterior end of the metal support 9 cooperates with the hook 5*d* of the upper cap 5 so as to guarantee axial retention of the upper cap 5 on the support 9 between which the rolling bearing 7 is clamped and seals the thrust bearing 1.

The body 8 of the lower cap 6 is molded over the axial portion 9*d* and the radial portion 9*e* of the metal support 9, thus securing the body to the support 9 and by extension to the upper cap 5. The body includes an annular portion 8*a* the lower surface 8*b* of which is in contact with the upper end turn of the spring 3 and extended toward the interior side Cc by a rounded surface followed by a slightly frustoconical surface 8*c* so as to guarantee good centering of the spring on the body 8. The frustoconical surface 8*c* corresponds to an exterior surface of a tubular portion 8*d* of the body 8. The tubular portion 8*d* defines a bore 8*e* in which the rod 3 and the shock absorber bump stop 4 are engaged. The bore 8*e* includes an annular bead 8*f*. The rib 4*a* of the bump stop 4 is inserted between the lower surface 9*c* of the support 9 and the bead 8*f* of the body 8 so as to guarantee axial retention of the bump stop 4 in the suspension thrust bearing 1. In the normal operating mode, the exterior axial surface 4*c* of the bump stop 4 is in contact with the interior axial surface 8*g* of the bore 8*e* of the body 8 so as to guarantee radial retention of the bump stop 4 in the suspension thrust bearing 1. In the event of a shock to the suspension system of the vehicle, the shock absorber bump stop 4 is deformed by compression in the axial direction and expansion in the radial direction, its exterior surface 4*c* then coming into contact with the axial contact surface 8*h* located in the bore 8*e* under the bead 8*f*.

The body 8 of the lower cap 6 also includes a metal insert 10 entirely buried in the synthetic material of the body 8. The insert 10 includes a first axial portion 10*a*, a second axial portion 10*c* and a radial portion 10*b* connecting the two axial portions 10*a*, 10*c*. The first axial portion 10*a* is located at the level of the axial contact surface 8*h* in the bore 8*e* of the body 8 and near the border of the interior side Cc of the body 8. The second axial portion 10*c* is located at substantially the same level as the portion 10*a* in the body 8 but near the border of the exterior side Ce of the body 8. The radial portion 10*b* connects the extremities of the lower side Ci of the two axial portions 10*a* and 10*c*. The axial portion 10*a* includes at its end on the upper side Cs a radial portion 10*d* directed toward the interior side Cc of the suspension thrust bearing 1 so that this radial portion 10*d* is inside the bead 8*f*. This radial portion 10*d* makes it possible to guarantee sufficient stiffness of the bead 8*f* for axial retention of the rib 4*a* of the bump stop 4, in particular in the event of any tendency to pulling off by an axial force exerted toward the lower side Ci of the thrust bearing 1.

The operation of such a thrust bearing 1 is described next to explain its features. In the event of a shock to the suspension system of the vehicle, the shock absorber rod 3 slides in the body of the piston in which it is mounted, the spring 2 is compressed axially, exerting a force on the lower surface 8*b* of the body 8, and the shock absorber body 4 exerts forces on the suspension thrust bearing 1. On the one hand, the upper surface 4*b* of the shock absorber bump stop exerts an axial force F1 on the lower surface 9*c* of the metal support 9. The suspension thrust bearing 1 being fixedly fastened to a support block itself fastened to the chassis of the vehicle, the shock absorber bump stop 4 is immobilized in axial translation against the lower surface 9*c*. The shock absorber bump stop 4 being made from an elastic material, for example from rubber or an elastomer, it is compressed axially by the axial force F1. Being in the upper portion of the bump stop 4, the rib 4*a* suffers only a very significant deformation. Conversely, the lower portions of the bump stop 4 suffer very high deformation and are expanded radially in the direction of the exterior side of the rolling bearing. The exterior axial surface 4*c* of the bump stop then comes into contact with the axial contact surface 8*h* located in the bore 8*e* under the bead 8*f*. The bump stop 4 then exerts a high radial force F2 on the surface 8*h* of the body 8. The insert 10 and in particular the first axial portion 10*a* enable transmission of this force F2 to the interior of the body 8 and make it possible to support any deformation of the material of the lower part of the tubular portion 8*d* of the body 8 at the level of the contact with a deformed portion of the bump stop 4. The axial portion 10*a* may be deformed radially toward the exterior side Ce of the rolling bearing by the force F2 exerted. The radial portion 10*b* and the axial portion 10*c* that extend radially from the axial portion 10*a* and impart a U-shape to the insert make it possible to control the radial deformation of the axial portion 10*a* and impart properties of elasticity to the insert 10 enabling it to revert to its initial shape once the force F2 is no longer exerted when the shock has passed.

The present invention also concerns a suspension strut including a suspension thrust bearing 1 as described above including a shock absorber rod 3 and a spring 2 at its lower extremity and fixedly fastened to the chassis of a motor vehicle by its upper extremity.

The invention claimed is:

1. A suspension thrust bearing including at least one rolling bearing forming an axial thrust bearing disposed on a lower cap, the lower cap comprising a support configured to receive the at least one rolling bearing and a body disposed on the support, the body comprising:

an annular rolling bearing portion for a spring,
a tubular portion including a bore in which a shock absorber bump stop is inserted, and
an axial contact surface which extends in the axial direction and is defined on a lower portion of the bore of the tubular portion against which the shock absorber bump stop when deformed exerts a radial force, the tubular portion including a reinforcing insert located at the level of the axial contact surface, wherein the tubular portion of the lower cap further includes in its bore an annular bead directed toward an interior side of the suspension thrust bearing, the interior side corresponding to a main axis of the suspension thrust bearing, the bead including a portion of the reinforcing insert therein enabling its reinforcement in the event of a force exerted by the shock absorber bump stop and cooperating and interfering with an annular rib of the shock absorber bump stop such that the annular bead maintains the shock absorber bump stop such that an upper surface of the shock absorber bump stop is in constant contact with the support, wherein the support is comprised of metal.

2. The suspension thrust bearing as claimed in claim 1, wherein the reinforcing insert is buried in the tubular portion of the lower cap.

3. The suspension thrust bearing as claimed in claim 1, wherein the reinforcing insert includes at least one axial portion.

4. The suspension thrust bearing as claimed in claim 3, wherein in a single axial cross-section of the suspension thrust bearing, the reinforcing insert comprises:
   a first axial portion on the interior side of the thrust bearing,
   a second axial portion located on a same side of the main axis as the first axial portion and having a distance from the interior side of the thrust bearing that is greater than the first axial portion, the two axial portions being interconnected by a radial portion.

5. The suspension thrust bearing as claimed in claim 4, wherein the radial portion connecting the two axial portions of the reinforcing insert is located on a lower side of the thrust bearing.

6. The suspension thrust bearing as claimed in claim 1, wherein the insert includes an axial portion having a radial portion extending therefrom and directed essentially toward the interior side of the suspension thrust bearing and located in the annular bead.

7. The suspension thrust bearing as claimed in claim 1, further comprising an upper cap in direct contact with the rolling bearing and retaining means between the upper cap and the lower cap.

8. A suspension thrust bearing including at least one rolling bearing forming an axial thrust bearing disposed on a lower cap, the lower cap including a body having;
   an annular rolling bearing portion for a spring,
   a tubular portion including a bore in which a shock absorber bump stop is inserted, and
   an axial contact surface which extends axially and is defined on a lower portion of the bore of the tubular portion against which the shock absorber bump stop when deformed exerts a radial force, the tubular portion including a reinforcing insert located at the level of the axial contact surface,
   wherein the tubular portion of the lower cap further includes in its bore an annular bead directed toward an interior side of the suspension thrust bearing, the interior side corresponding to a main axis of the suspension thrust bearing, the bead including a portion of the reinforcing insert therein enabling its reinforcement in the event of a force exerted by the shock absorber bump stop and cooperating and interfering with an annular rib of the shock absorber bump stop,
   wherein in a single axial cross-section of the suspension thrust bearing, the reinforcing insert comprises a first axial portion on the interior side of the thrust bearing, a second axial portion located on a same side of the main axis as the first axial portion and having a distance from the interior side of the thrust bearing that is greater than the first axial portion, the two axial portions being interconnected by a radial portion.

9. A suspension strut equipped with a suspension thrust bearing having at least one rolling bearing forming an axial thrust bearing disposed on a lower cap, the lower cap comprising a support configured to receive the at least one rolling bearing and a body disposed on the support, the body comprising:
   an annular rolling bearing portion for a spring,
   a tubular portion including a bore in which a shock absorber bump stop is inserted, and
   an axial contact surface which extends axially and is defined on a lower portion of the bore of the tubular portion against which the shock absorber bump stop when deformed exerts a radial force, the tubular portion including a reinforcing insert located at the level of the axial contact surface,
   wherein the tubular portion of the lower cap further includes in its bore an annular bead directed toward an interior side of the suspension thrust bearing, the interior side corresponding to a main axis of the suspension thrust bearing, the bead including a portion of the reinforcing insert therein enabling its reinforcement in the event of a force exerted by the shock absorber bump stop and cooperating and interfering with an annular rib of the shock absorber bump stop such that the annular bead maintains the shock absorber bump stop such that an upper surface of the shock absorber bump stop is in constant contact with the support, wherein the support is comprised of metal.

10. The suspension strut as claimed in claim 9, wherein in a single axial cross-section of the suspension strut, the reinforcing insert comprises:
   a first axial portion on the interior side of the thrust bearing,
   a second axial portion located on a same side of the main axis as the first axial portion and having a distance from the interior side of the thrust bearing that is greater than the first axial portion, the two axial portions being interconnected by a radial portion.

* * * * *